US012792841B1

(12) United States Patent
Zhang et al.

(10) Patent No.: US 12,792,841 B1
(45) Date of Patent: Nov. 10, 2026

(54) SCALABLE MACHINE LEARNING INFERENCE

(71) Applicant: Amazon Technologies, Inc., Seattle, WA (US)

(72) Inventors: Yi Zhang, Sammamish, WA (US); Lijia Sun, Jersey City, NJ (US); Anthony Ferritto, New York, NY (US); Daniele Bonadiman, Sunnyvale, CA (US); Saab Mansour, San Jose, CA (US); Arshit Gupta, Redmond, WA (US); Nikolaos Pappas, Seattle, WA (US); John Baker, Bellevue, WA (US); Santosh Kumar Ameti, Bellevue, WA (US); Chethan Krishna Nagaraja Rao, Bellevue, WA (US); Meghana Puvvadi, Redmond, WA (US); Navneet Sabbineni, Seattle, WA (US); Ganesh Kumar Gella, Redmond, WA (US); Naveen Kumar Vedurupaka, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 661 days.

(21) Appl. No.: 18/067,290

(22) Filed: Dec. 16, 2022

(51) Int. Cl.

| | |
|---|---|
| ***G06F 40/35*** | (2020.01) |
| ***G06F 40/117*** | (2020.01) |
| ***G06F 40/126*** | (2020.01) |
| ***G06F 40/284*** | (2020.01) |

(52) U.S. Cl.
CPC ............ *G06F 40/35* (2020.01); *G06F 40/117* (2020.01); *G06F 40/126* (2020.01); *G06F 40/284* (2020.01)

(58) Field of Classification Search
CPC ...... G06F 40/35; G06F 40/117; G06F 40/126; G06F 40/284
See application file for complete search history.

(56) References Cited

U.S. PATENT DOCUMENTS

| | | | | |
|---|---|---|---|---|
| 2019/0213284 | A1 * | 7/2019 | Anand | G06F 3/0484 |
| 2021/0217408 | A1 * | 7/2021 | Hakkani-Tur | G06N 3/02 |
| 2022/0246141 | A1 * | 8/2022 | Mirrezaei | G06F 40/30 |
| 2023/0177401 | A1 * | 6/2023 | Yu | G06N 3/084 |
| 2023/0274091 | A1 * | 8/2023 | Gao | G06F 16/3329 704/9 |

* cited by examiner

*Primary Examiner* — Athar N Pasha
(74) *Attorney, Agent, or Firm* — Nicholson De Vos Webster & Elliott LLP

(57) ABSTRACT

Systems, methods, and apparatuses for contextual natural language understanding are detailed. An exemplary method includes receiving a user utterance provided by a user within a multi-turn chat dialog between the user and a conversational agent; encoding the user utterance into a sequence of tokens using an encoder that is independent of an intent classification and slot labelling (ICSLH); and obtaining, using the ICSLH, an intent classification and one or more slot labels from the encoded user utterance and contextual information associated with one or more previous turns of the multi-turn chat dialog, the contextual information associated with each turn of the one or more previous turns including a previous intent, a previous dialog act, an active context, and an elicited slot.

20 Claims, 13 Drawing Sheets

SCALABLE MACHINE LEARNING INFERENCE

BACKGROUND

Modern natural language understanding (NLU) models often neural networks that consist of two key functional components, an encoder and a classification head which. Raw textual data, like sentences/utterances, is first converted to numerical representations, then passed to the encoder. Encoders are usually transformer based multi-headed self-attention layers that applied attention mechanism to encode information. In the end, tas7k specific classification head(s), is attached to use encoded information for predictions.

BRIEF DESCRIPTION OF DRAWINGS

Various examples in accordance with the present disclosure will be described with reference to the drawings, in which.

DETAILED DESCRIPTION

Figure 1:
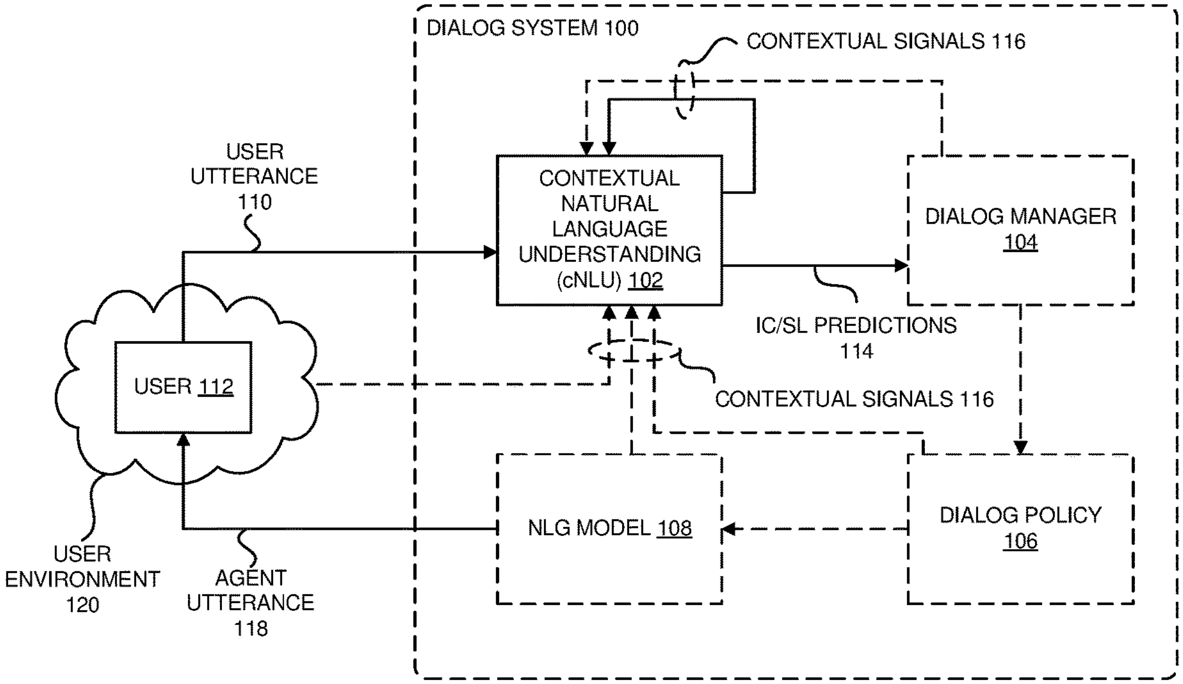
FIG. 1 is a diagram illustrating an environment for an example dialog system including a cNLU framework according to some embodiments.

The use of smart conversational agents is becoming widespread—for example, such agents can be found in smart speakers, smartphones, and many other devices and applications. The foundation of such conversational agents is a dialogue system. In many cases, these dialogue systems cater to task-oriented dialogues where a user is trying to achieve a goal such as, for example, booking an airline flight, ordering food from a restaurant, or scheduling an appointment. For such systems to operate successfully, the dialogue system strives to understand a user's goals and requests at each turn of the dialogue.

NLU is an important component of such dialog systems and, in particular, for capturing semantic information from a user's utterances at each turn of a dialogue with a smart conversational agent. At a high level, NLU in this context involves two tasks: intent classification (IC) and slot labeling (SL). An intent in the context of IC identifies the goal underlying an expressed utterance (that is, what the user is trying to achieve with the utterance), and slots identify optional parameters of these intents (that is, information provided by the user in the utterance that is relevant to the user's intent).

A growing challenge of Machine Learning Model deployment is the limited hardware memory space verses increasing size of the models. In many applications, such as NLU tasks, each model is trained on customer supplied data from end-to-end. At inference, memory space has to be allocated to each model. Therefore, as the traffic grows, it becomes more and more difficult to keep scaling nor sustain. To break through the bottleneck, a decoupled architecture is described.

Different from usual settings, where all the trainable parameters in a NLU model are updated as an entirety at training, examples herein describe a NLU model that has at least two subnetworks an encoder and intent classification and slot labeling head (ICSLH) where the encoder (depending on the example) may not change.

During training, an encoder and an ICSLH are loaded. Depending on the use case, an encoder can either be global or private. For a global shared encoder (SE), its parameters are pre-trained on large data to acquire the ability to encode textual information efficiently. In training, its parameters are frozen, meaning no parameters updated. By doing so, the same SE can be shared/re-used for different applications at inference time, thus significantly reducing the overall deployment memory footprint. For a private encoder (PE), its parameters are trained along with a ICSLH. PEs are often used in cases where custom model adaptation is required. In some examples, at inference, encoders are loaded from a model registry to accelerator (e.g., GPU, tensor, matrix, APU, etc.) machines and one or more ICSLHs to CPU-based machines.

In some examples, the encoder and ICSLH approach utilizes a contextual natural language understanding (cNLU) framework that is able to incorporate contextual signals including at least one or more of: a previous intent, a previous (system/bot) dialog act, a previous elicited slot, and/or a previous utterance to perform joint intent classification (IC) and slot labeling (SL). According to some embodiments, a user utterance provided by a user within a multi-turn chat dialog between the user and a conversational agent is received. The user utterance and contextual information associated with one or more previous turns of the multi-turn chat dialog is provided to a cNLU framework which includes at least one machine learning (ML) model. In one embodiment, the contextual information is included as a part of a session request (e.g., a putsession request). An intent classification and one or more slot labels for the user utterance are then obtained from the cNLU framework. The cNLU framework thus uses, in addition to a current utterance itself, various contextual signals as input to generate IC and SL predictions for each utterance of a multi-turn chat dialog. In some embodiments, the model is further configured to intelligently select which signals to include, and which signals to ignore, when considering the collection of contextual information.

In many existing dialog systems, NLU is followed by a rule-based dialogue management (DM) component. The NLU components in existing dialog systems thus largely process utterances in isolation and push the problem of context management to downstream components. However, contextual information is often highly relevant to the correct interpretation of intents during the NLU stage since the intent of a user's utterance often needs to be interpreted in the context of a conversation. Embodiments described herein relate to a contextually-sensitive NLU framework, or cNLU framework that utilize and encoder and/or a ICSLH, including example cNLU frameworks that enable contextual information to be taken into consideration during IC and SL, thereby providing more signals to the dialogue management and other components further down the pipeline. In contrast to existing NLU strategies, the embodiments described herein explicitly model more comprehensive contextual information for training IC and SL tasks, for example, by leveraging previous utterances, dialogue acts, intent classifications, and slot labels.

Pre-trained language models (LM) have advanced the state-of-the-art in many natural language processing applications through self-supervised learning with large unannotated corpus. In combination with powerful and versatile neural network architectures like Transformer, the pre-training and fine-tuning approach has become the de facto standard in the new era of NLP research. However, in real-world applications, the proper and thorough understanding of natural language often requires additional sophisticated representation of context in which human language is used, which might involve extra-linguistic knowledge. The success of the model crucially depends on the tight integration of language representation with additional information.

FIG. 1 is a diagram illustrating an environment for an example dialog system including a cNLU framework according to some embodiments. As shown in FIG. 1, the dialog system 100 includes a cNLU framework 102 and other optional components including a dialog manager 104, dialog policy component 106, and natural language generation (NLG) model 108, among other possible components. In some examples, the dialog system 100 represents a chatbot service of a provider network. At a high level, the dialog system 100 receives user utterances (e.g., a user utterance 110) from users (e.g., a user 112), uses a cNLU framework to generate IC/SL predictions 114 (based on both the user utterance 110 and other contextual signals 116, as described in more detail herein), passes the IC/SL predictions 114 to a dialog manager 104 that maintains state information related to the dialog, a dialog policy manager that decides on a next action to be performed by the system based on data from the cNLU framework 102 and dialog manager 104, and finally a NLG component which forms a reply that is converted into an agent utterance 118 (e.g., a text-based reply, voice-based reply, or the like) that can be understood by the user 112.+ Examples of a cNLU framework 102 are described in more detail in sections hereinafter.

In some embodiments, one or more components of a dialog system 100 are implemented as a service at least in part using resources provided by a provider network. A provider network provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks may utilize one or more user accounts that are associated with a customer account, though these terms may be used somewhat interchangeably depending upon the context of use. Users may interact with a provider network across one or more intermediate networks (e.g., the internet) via one or more interface(s), such as through use of application programming interface (API) calls, via a console implemented as a website or application, etc. The interface(s) may be part of, or serve as a front-end to, a control plane of the provider network that includes "backend" services supporting and enabling the services that may be more directly offered to customers.

To provide these and other computing resource services, provider networks often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

As indicated above, conversational agents continue to evolve and the conversations that occur with such agents are becoming increasingly complex. The complexity of these conversations in part involves the need to rely more on contextual cues to interpret each utterance of a multi-turn dialogue. In existing NLU frameworks, the resolution of utterances in context is typically addressed in the DM component of the system using rule-based dialogue state trackers. However, this arrangement pushes the problem of contextual understanding further down the dialogue pipeline. Despite the appeal of the modular design, this arrangement can often result in various types of cascading errors and other issues at the NLU stage.

According to embodiments described herein, a cNLU framework is described that mitigates many of the issues described above while still maintaining a modular and interpretable framework. At a high level, the cNLU framework is configured to take into account various types of contextual information during the IC and SL tasks, thereby providing more signals to the dialogue management components further down the pipeline. Compared to previous NLU strategies, the cNLU framework explicitly models more comprehensive contextual information training IC and SL tasks by leveraging previous utterances, dialogue acts, and previous intent classes and slot labels, among other possible signals. As shown in FIG. 1, these contextual signals 116 can be obtained from the cNLU framework itself, from other components of the dialog system 100 (e.g., a dialog manager 104, dialog policy 106 component, and/or NLG model 108) as well as from a user environment 120 (e.g., information about a user's location, time of day, etc.), or any combinations thereof.

Figure 2:
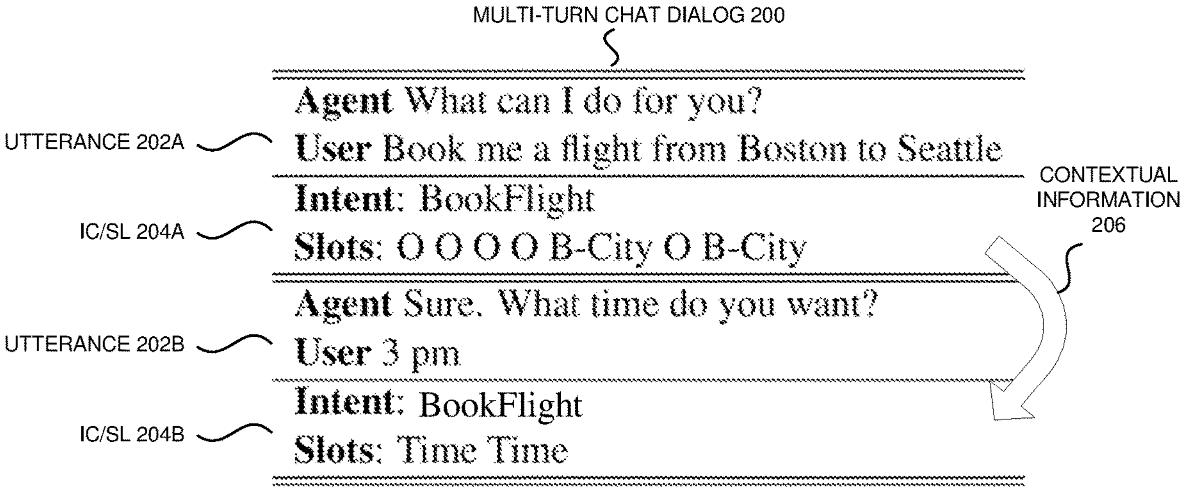
FIG. 2 illustrates an example of a multi-turn chat dialog.

FIG. 2 illustrates an example of a multi-turn chat dialog. The example multi-turn chat dialog 200 illustrated in FIG. 2 shows two turns along with IC/SL predictions generated for each turn. In the example of FIG. 2, in response to the prompt from the agent, a user provides a first utterance 202A: "Book me a flight from Boston to Seattle." In response to receiving this utterance, a cNLU framework 102 generates IC and SL predictions IC/SL 204A, indicating that it was determined that the intent was "BookFlight" and that slot labels were determined for each token of the utterance, including indications that "Boston" and "Seattle" refer to cites relevant to the user's intent.

Similarly, a user provides a second utterance 202B in response to the agent's next prompt requesting a time from the user: "3 μm." As illustrated in the examples described herein, a cNLU framework again generates IC and SL predictions IC/SL 204B based on the user's second utterance 202B but also based at least in part on contextual information 206 associated with the multi-turn chat dialog 200 as a whole such as, for example, the previous utterance 202A, previous IC/SL 204A, and previous dialog act. Although only two turns are shown in the example chat dialog 200 illustrated in FIG. 2, in general, a multi-turn chat dialog can include any number of turns between a user and an agent and a cNLU framework 102 can take into account contextual information related to any number of previous turns in the conversation.

In some embodiments, a cNLU framework 102 is formalized generally as follows. For a conversation with n turns:

Agent Utterances: $A=\{a_1, a_2, \ldots, a_n\}$
User Utterances: $U=\{u_1, u_2, \ldots, u_n\}$
Intents: $I=\{i_1, i_2, \ldots, i_n\}$
Slot Labels: $SL=\{sl_1, sl_2, \ldots, sl_n\}$
Dialog Acts: $DA=\{da_1, da_2, \ldots, da_n\}$
Slot Elicitation: $SLE=\{sle_1, sle_2, \ldots, sle_n\}$ In the formulation above, a dialog act refers to the actions taken by an agent such as "Close" (for example, when an intent is fulfilled), "ConfirmIntent," "ElicitSlot," and so forth. A slot elicitation indicates the slot(s) to elicit when the dialog act is "ElicitSlot."

In a traditional NLU system, for a turn t in a multi-chat dialog, the intents and slots are given by:

$$i_t, sl_t = f_{no\_context}(u_t)$$

where $f_{no\_context}$ is typically implemented by an encoder-decoder architecture with attention. As the formulation above indicates, for a given user utterance $u_t$, existing NLU systems predict an IC and a set of one or more SLs based solely on the user utterance itself and without reference to other contextual information related to the multi-turn dialog of which the utterance is a part.

According to embodiments described herein, for a multi-turn chat dialog with a context window of K, and for turn t, a cNLU framework instead provides the intents and slots by: $i_t, sl_t=f_{context}(u_t, c_t)$. To learn this $f_{context}$, in some embodiments, contextual signals are leveraged along with the current utterance.

Figure 3:
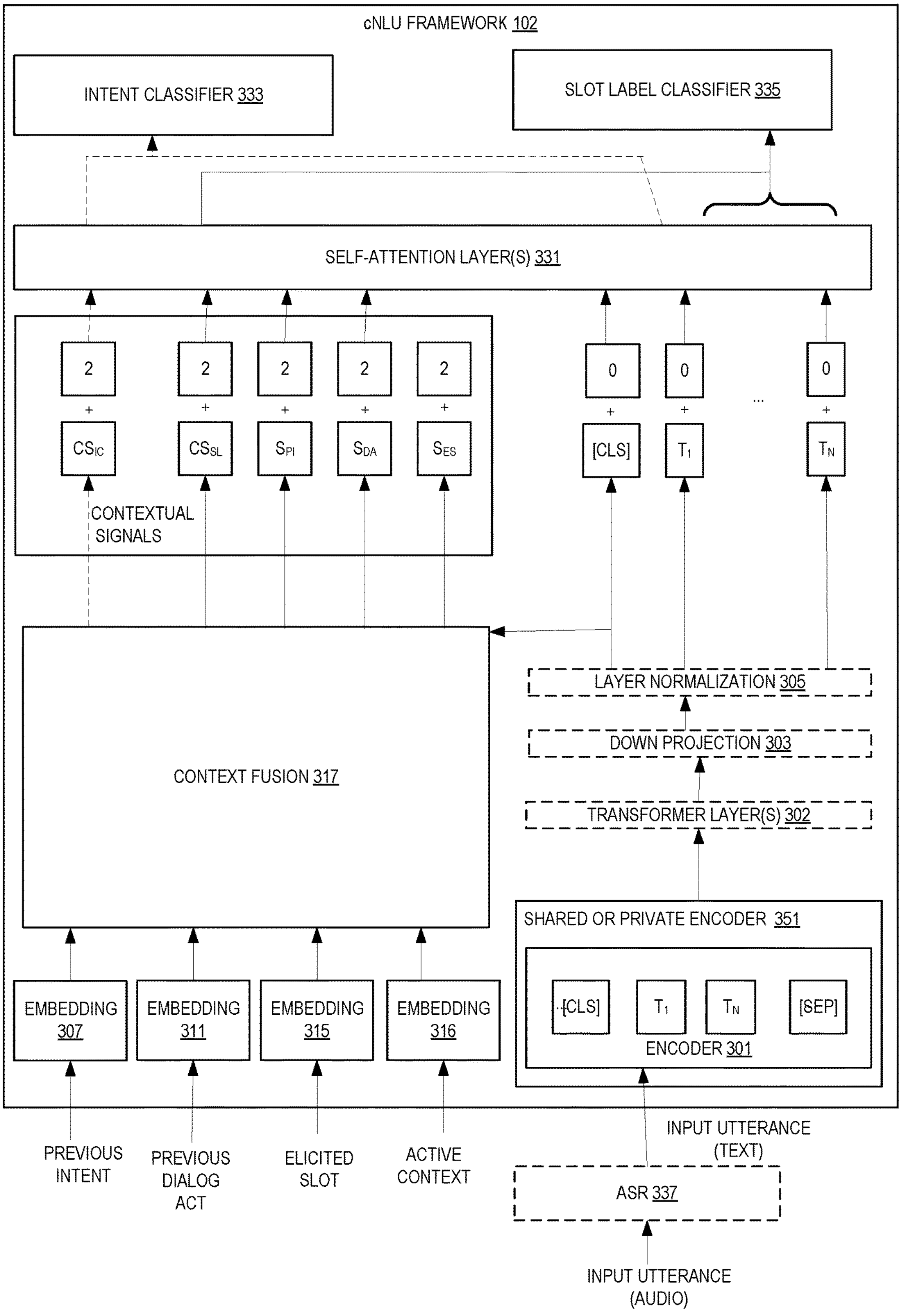
FIG. 3 illustrates embodiments of a cNLU framework for joint IC and SL prediction.

FIG. 3 illustrates embodiments of a cNLU framework for joint IC and SL prediction. As shown, there is an encoder subnetwork (shared encoder or private 351) and a ICSLH subnetwork that is everything else in some examples. In some examples, the embeddings are not a part of the ICSLH.

Given a current user turn $u_t$, and the corresponding contextual signals as described earlier, the goal is to identify the intent $I_t$ for the current utterance and the slots labels $S_1$-$S_{11}$, $s_{12}$, . . . , $S_{lm}$ for each token in the utterance, if the current utterance has m tokens. This information is further utilized by downstream components to fulfill the actual goal as requested by the user.

In particular, a pre-trained language model (LM) produces a contextualized encoding of the input utterance tokens which are fused with encoded contextual signals. Specifically, in some embodiments, a pre-trained transformer (e.g., Bidirectional Encoder Representations from Transformers (BERT)) model encodes the input utterance, and which is further contextualized using encoding of the conversation contextual signals using a stack of K self-attention layers.

As illustrated, contextual signals of a previous intent (PI), dialog act (DA), active context (AC), and an elicited slot (ES) are discrete input signals into the cNLU framework 102. The PI signifies the intent of previous user turn $u_t$−1 of a conversation and is useful to identify the active intent based on other contextual information, for instance, if the previous intent was fulfilled or not. The DA signifies the action requested by the agent for the current user turn $u_t$ to fulfill the conversation. Examples of dialog acts include, but are not limited to: ConfirmIntent (the agent is expected a yes or no response to confirm the intent before fulfillment), ElicitIntent (the agent wants to elicit the user's intent), ElicitSlot (the agent is expecting the value of a slot for the current intent), Failed (the conversation has failed), Fulfilled (the intent has been fulfilled), and/or ReadyForFulfillment (the client has to fulfill the intent). Note that in some embodiments, the dialog act is called the dialog state. The ES signifies the name of the slot being elicited if the dialog act is ElicitSlot for a current turn. These contextual signals come from the dialog state we may be maintained by one or more of the bot itself, the NLG model 108, the dialog manager 104, and the dialog policy 106.

Each of the contextual signals (PI, DA, ES, AC) is encoded using embedding layers 307, 311, 315, and 316 and subjected to context fusion layer 317. The context fusion layer 317 generates the normalized output embeddings(S) and contextual signal (CS) encodings.

Figure 4:
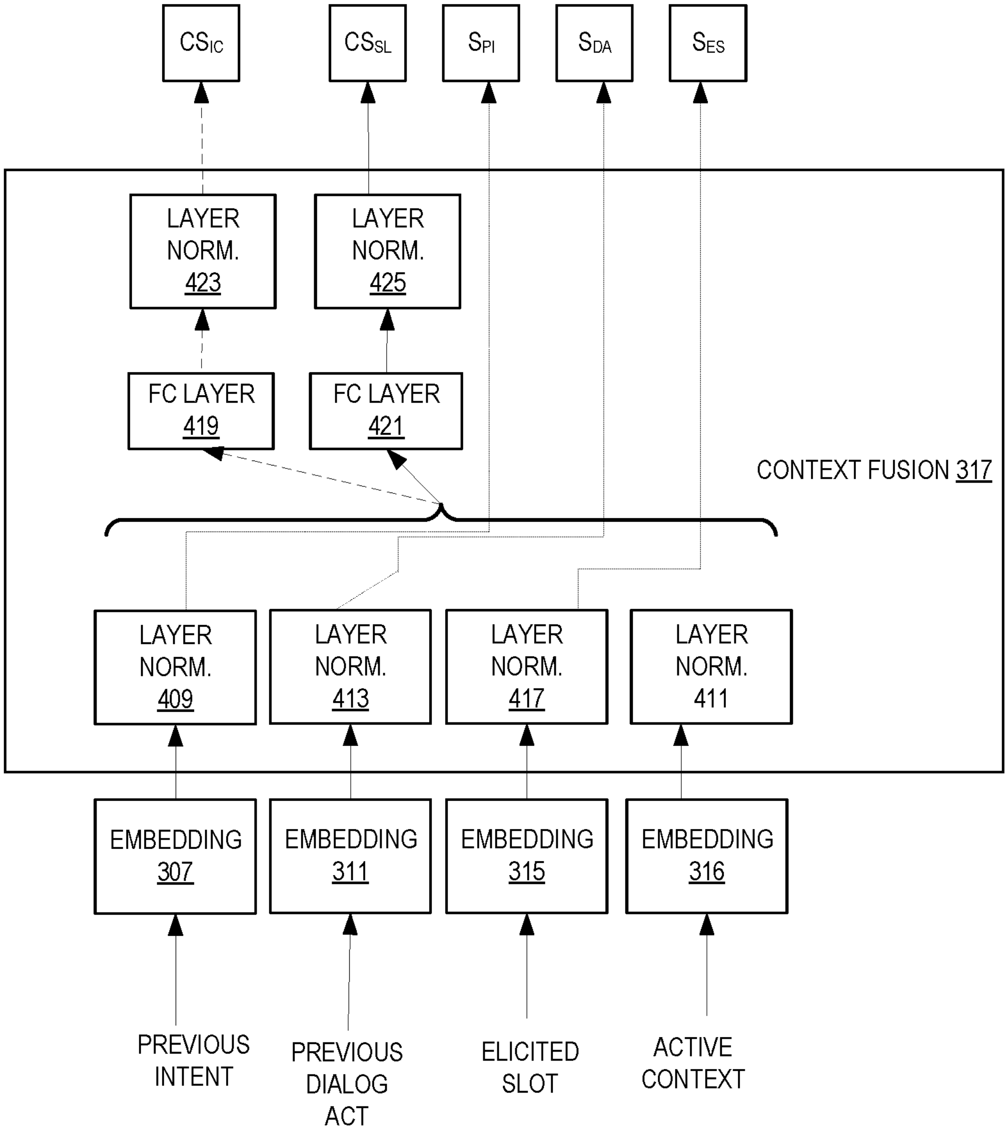
FIG. 4 illustrates examples of a contextual fusion layer.

FIG. 4 illustrates examples of a contextual fusion layer. As shown, encoded contextual signals are normalized using normalization layers 409, 413, 411, and/or 417 to generate normalized output embeddings(S) and contextual signal (CS) encodings. In some examples, this are formally defined in some embodiments as:

$$S_{PI} = LayerNorm_{PI}(Embed_{PI}(PI))$$

$$S_{DA} = LayerNorm_{DA}(Embed_{DA}(DA))$$

$$S_{ES} = LayerNorm_{ES}(Embed_{ES}(ES))$$

$$CS_{IC} = [S_{PI}, S_{DA}, S_{ES}, S_{AC}]W^T_{CS_{IC}} + b_{CS_{IC}}$$

$$CS_{SL} = [S_{PI}, S_{DA}, S_{ES}, S_{AC}]W^T_{CS_{SL}} + b_{CS_{SL}}$$

where [., ., .] is a concatenation operator and $W_{CS_{IC}}$, $b_{CS_{IC}}$, $W_{CS_{SL}}$, and $b_{CS_{SL}}$ are learnable parameters.

The normalized output embeddings SPI, SDA, and SES are then combined into at least two different task-specific linear projections using fully connected layers 419 or 421 (the output of which may be normalized using normalization layers 423 or 425).

In some embodiments, the contextual signals include the previous utterance in the conversation. The previous utterance is encoded using encoder 301 (e.g., a transformer-based encoder, LSTM, etc.) to get the CLS sequence and the encoded utterance normalized using layer normalization layer 305. Note that an intermediate down projection layer 303 and/or one or more transformer layers 302 may also be applied. As such, an additional normalized output embedding would be: $S_{Pu}$=LayerNorm$_{Pu}$(Embed$_{Pu}$(PU)). This would change the CSes to be:

$$IC = [S_{PI}, S_{DA}, S_{ES}, S_{AC}, S_{PU}]W_{CS_{IC}}^T + b_{CS_{IC}}$$

$$CS_{SL} = [S_{PI}, S_{DA}, S_{ES}, S_{AC}, S_{PU}]W_{CS_{SL}}^T + b_{CS_{SL}}$$

In some embodiments, an input utterance is in an audio format and is subjected to automatic speech recognition (ASR) 337 to generate input utterance text. The input utterance text is provided to shared or private encoder 351. In some examples, the shared or private encoder 351 comprises one or more transformer embeddings which feed one or more or more transformer layers. The input utterance text (whether or not it is from ASR) is subjected to an encoder 301 to determine a CLS token sequence. As shown, a class (CLS) and other tokens per word are encoded. In some embodiments, the encoder 301 is a transformer-based encoder. For each token of the input utterance, in some embodiments, the encoder 301 encodes at a dimensionality that may be excessive considering the limited number of intent classes and slot types to predict. This might also result in too much dilution in the information, making the learning process harder. As such, in some embodiments, the encoder 301 output encodings are down-projected using a down-projection layer 303 to the same dimensionality of the contextual signal embeddings. A layer normalization 305 is typically then applied. In some embodiments, given the token encoding h generated by the encoder 301, the down-projection t of the same token is computed as:

$$t = LayerNorm_{DP}\left(hW_{DP}^T + b_{DP}\right)$$

where $W_{DP}$ and $b_{DP}$ are learnable parameters.

The contextual signal encodings and the utterance token encodings are also associated with a token type embedding. In this example, the contextual signal encodings have a token type embedding of "2" and the utterance token encodings have a token type embedding of "0."

The contextual signals are encoded and the (down-projected) token encodings a fused using a stack of one or more self-attention layers 331 (such as transformer layers). The fusion makes the contextual signals attend to the (down-projected) token encodings and allows for the learning of hat to focus on based on the current dialog context. As FIG. 3 shows, in some embodiments, the sequence fed to the self-attention layers is composed of the contextual signal encodings, followed by the normalized output embeddings, i.e., $$\langle CS_{IC}, CS_{SL}, S_{PI}, S_{DA}, S_{ES}, [CLS], T_1, \ldots, T_n\rangle \text{ or}$$

-continued $$\langle CS_{IC}, CS_{SL}, S_{PI}, S_{DA}, S_{ES}, S_{PU}, [CLS], T_1, \ldots, T_n\rangle$$

The token type (or segment) embeddings model the distinction between context representations and utterance representation.

In some embodiments, the output layer is composed of two task-specific linear classifiers. In some embodiments, other classifier types are utilized for at least one of the classifiers. Specifically, the IC classifier 333 is fed with the concatenation of the encodings of $CS_{IC}$ and [CLS] output from the stack of self-attention layers 331. Similarly, for the tokens of the input utterance, the corresponding encoding coming from the stack of self-attention layers 331 is concatenated with the encoding of $CS_{SL}$ and fed to SL classifier 332.

In some embodiments, an encoded sequence from the stack of self-attention layers 331 is:

$$\left\langle h_{CS_{IC}}, h_{CS_{SL}}, h_{S_{PI}}, h_{S_{DA}}, h_{S_{ES}}, h_{[CLS]}, h_{T_1}, \ldots, h_{T_n}\right\rangle \text{ or}$$

$$\left\langle h_{CS_{IC}}, h_{CS_{SL}}, h_{S_{PI}}, h_{S_{DA}}, h_{S_{ES}}, h_{S_{PU}}, h_{[CLS]}, h_{T_1}, \ldots, h_{T_n}\right\rangle$$

The IC prediction for input utterance and the SL prediction for the generic token $t_i$ are defined as:

$$y_{IC} = \left[h_{CS_{IC}}, h_{[CLS]}\right]W_{IC}^T + b_{IC}$$

$$y_{SL,t_i} = \left[h_{CS_{SL}}, h_{t_{i1}}\right]W_{SL}^T + b_{SL}$$

where $W_{IC}$, $b_{IC}$, $W_{SL}$ and $b_{SL}$ are learnable parameters.

In some embodiments, a few layers can be truncated from the encoder 301 without impacting model performance on downstream task. How many layers to remove may be determined by removing a fixed number of layers from the top of pre-trained multiple layer encoder (used for encoding user utterances), fine-tuning on the IC-SL task, and then evaluating the performance for each configuration.

In addition to the traditional IC and SL tasks, some production NLU systems also need to be able to detect and reject out-of-scope user utterances. In some embodiments, the intent classifier is trained with an additional out-of-scope (OOS) class with examples sampled from a set of domain-irrelevant utterances.

When deploying for inference the ICSLH and shared encoder may be loaded separately. In some examples, the shared encoder and ICSLH are loaded to use the same processing hardware (e.g., a central processing unit (CPU), a graphical processing unit (GPU), etc.). In some examples, the shared encoder and ICSLH are loaded to use different processing hardware. For example, loading the shared encoder to use an accelerator (such as a tensor processor, matrix processor, APU, GPU, etc.) and the ICSLH to use a CPU. For the shared encoder, in some examples loading is done on a designated device. Instead of predicting a single utterance, a batch of samples may be predicted. In some examples, the ICSLH should be aware of where and have permissions to retrieve trained artifacts (such as a from a model storage).

Figure 5:
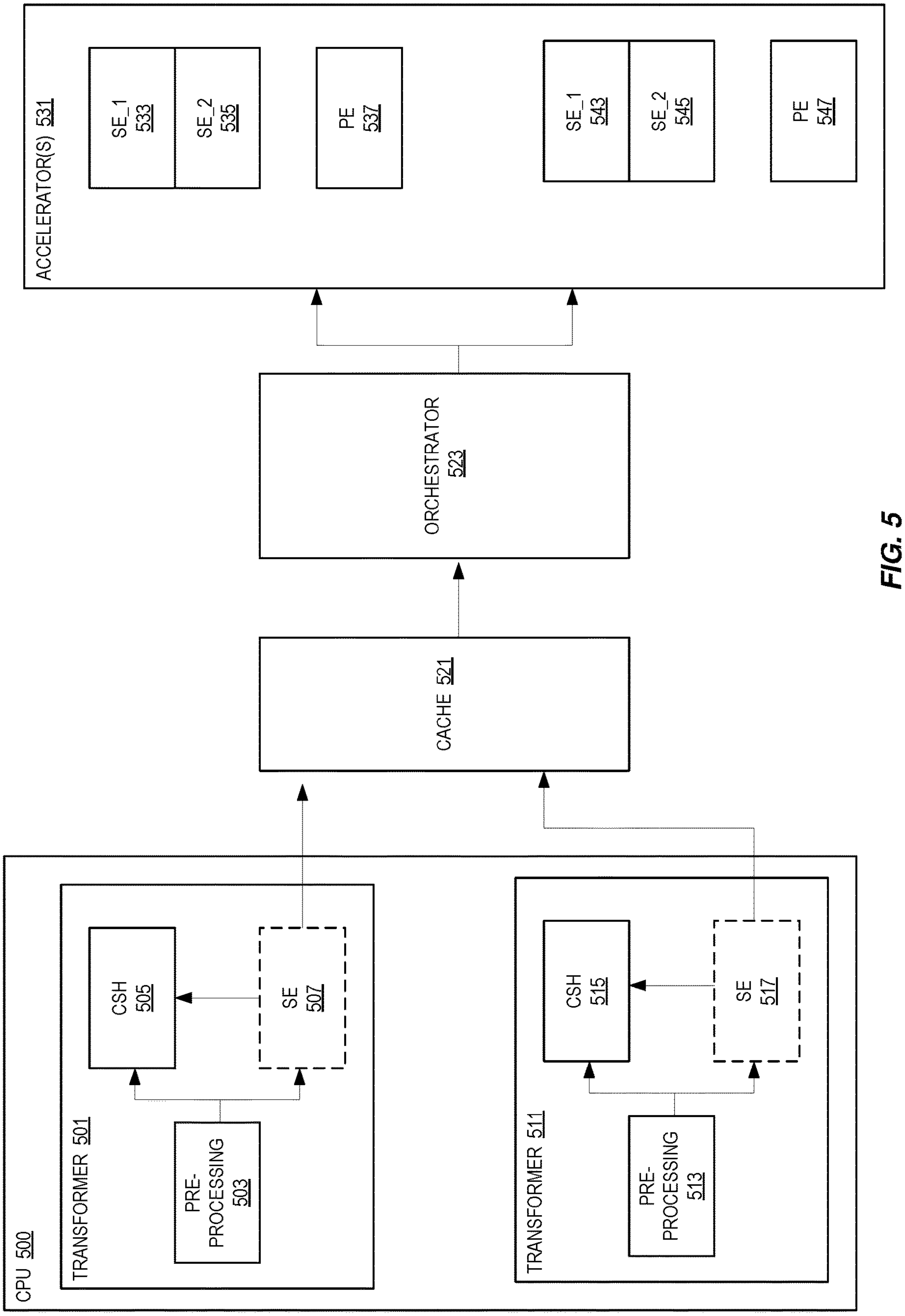
FIG. 5 illustrates examples of a decoupled ICSLH and shared encoder deployment.

FIG. 5 illustrates examples of a decoupled ICSLH and shared encoder deployment. In this example, a plurality of models (shown here as either transformer 501 and transformer 511) has a pre-processing stage 503 and 513 and a ICSLH stage 505 and 515 and is deployed to use one or more CPUs 500. Note that shared encoder (SE) stage 507 and 517 is shown, but not used and requests to the SE stages 507 and 517 are routed to cache 521.

Shared encoders (SEs) are loaded to use one or more accelerators 531. As shown, there may be multiple shared encoders to choose from such as shared encoders 533 and 535 (or 543 and 545), and a private (e.g., trained for a particular client) encoder 537 (or 547).

Traffic from multiple CPU instances is collected by a cache 521. When the cache 521 is full or every after a period of time, the cache 521 passes aggregated requests to an orchestrator 523 to determine how to proceed. For example, the orchestrator 523 may determine which accelerator is not busy (if multiple accelerators are used), scale up or down based on the volume of requests, load balance, self-heal (e.g., replace and restart failed containers), and/or dispatch request(s) to the correct SE for processing.

This approach reduces the memory footprint needed since the same SE may be used for different applications. This also may be faster if an accelerator is faster than a CPU for inference. Throughput may be improved as requests from multiple models can be batched in the cache 521 and handed off to a SE. The CPU and accelerator may be scaled independent of each other which may result in savings. Additionally, encoder usage can be configured to use a global SE or a private (client/class) SE.

Figure 6:
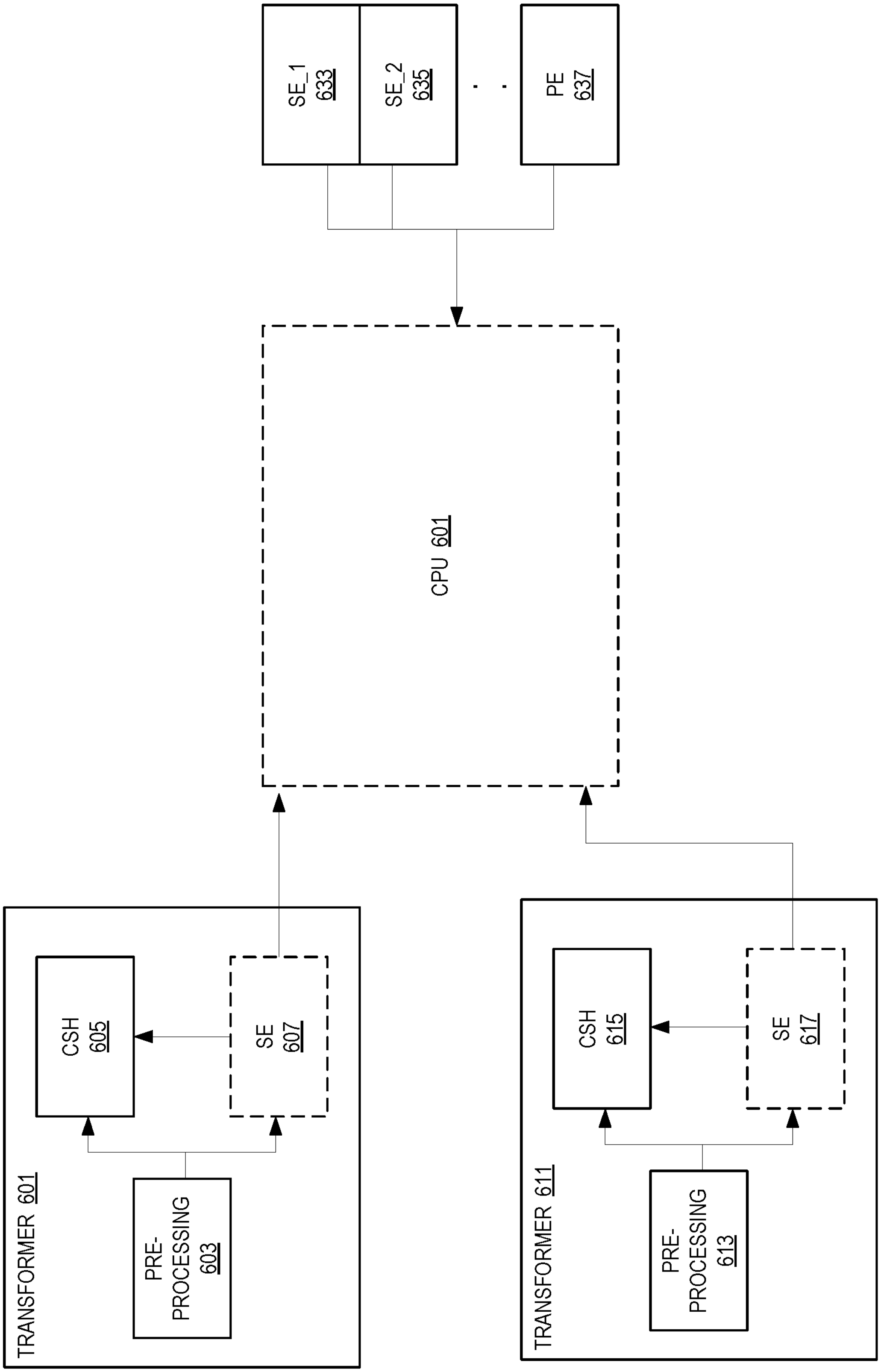
FIG. 6 illustrates examples of a decoupled ICSLH and shared encoder deployment on the same node (e.g., using a CPU for both).

FIG. 6 illustrates examples of a decoupled ICSLH and shared encoder deployment on the same node (e.g., using a CPU for both). In this example, a plurality of models (shown here as either transformer 601 and transformer 611) has a pre-processing stage 603 and 613 and a ICSLH stage 605 and 615 and is deployed to use one or more CPUs 601. Note that shared encoder (SE) stage 607 and 617 is shown, but not used and requests to the SE stage 607 and 617 are routed a particular SE (e.g., SE_1 633, SE_1 635, or PE 637). At inference, traffic from multiple bots passed to CPU cores to process, when SE is needed, CPU can read from the same memory that stores a particular SE.

Figure 7:
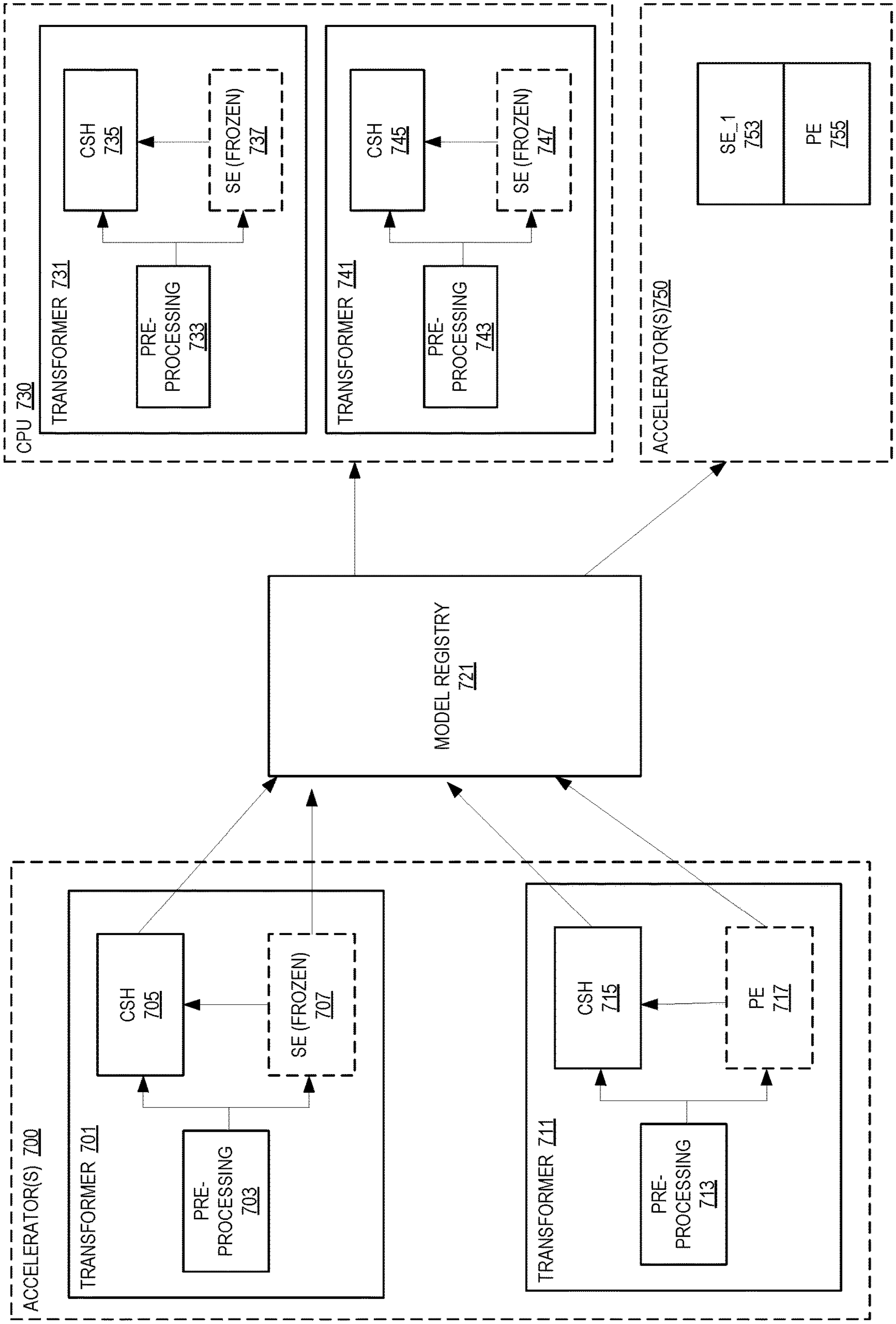
FIG. 7 illustrates examples of a training environment.

FIG. 7 illustrates examples of a training environment. In this example, a plurality of models (shown here as either transformer 701 and transformer 711) has a pre-processing stage 703 and 713 and a ICSLH stage 705 and 715 and are trained on one or more accelerators 700. Note that shared encoder (SE) stage 707 is frozen for one model (that is it global) and class/client specific 717 for the other model. After training, the ICSLH stages and SE stages are stored in a model registry 721.

During inference, a plurality of models (shown here as either transformer 731 and transformer 741) has a pre-processing stage 733 and 743 and a ICSLH stage 735 and 735 to be utilized on one or more CPUs 703. The ICSLH stages are retrieved from the model registry 721. One or more accelerators 750 are used to implement a trained shared encoder 753 and/or PE 755 that are retrieved from the model registry 721.

Figure 8:
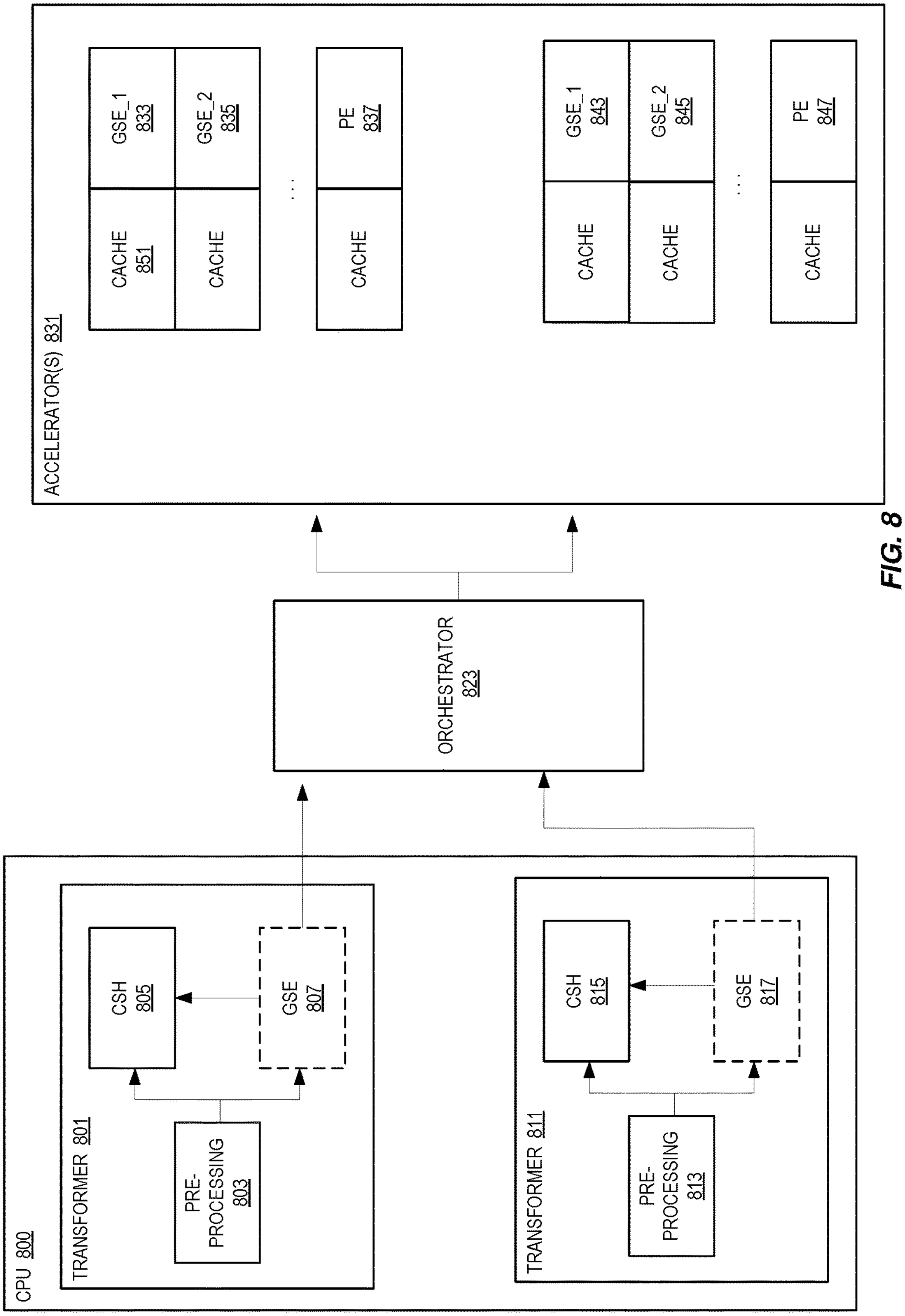
FIG. 8 illustrates examples of a decoupled ICSLH and shared encoder deployment.

FIG. 8 illustrates examples of a decoupled ICSLH and shared encoder deployment. In this example, a plurality of models (shown here as either transformer 801 and transformer 811) has a pre-processing stage 803 and 813 and a ICSLH stage 805 and 815 and is deployed to use one or more CPUs 800. Note that SE stages 807 and 817 are shown, but not used and requests to the SE stage 807 and 817 are routed to the orchestrator 823.

SEs are loaded to use one or more accelerators 831. As shown, there may be multiple shared encoders to choose from such as shared encoders 833 and 835 (or 843 and 845), and a private (e.g., trained for a particular client) encoder 837 (or 847).

Traffic from multiple CPU instances is collected by caches (such as cache 851) per encoder. This approach reduces the memory footprint needed since the same SE may be used for different applications. This also may be faster if an accelerator is faster than a CPU for inference. Throughput may be improved as requests from multiple models can be batched in the caches and handed off to a SE. The CPU and accelerator may be scaled independent of each other which may result in savings. Additionally, encoder usage can be configured to use a global SE or a PE.

Figure 9:
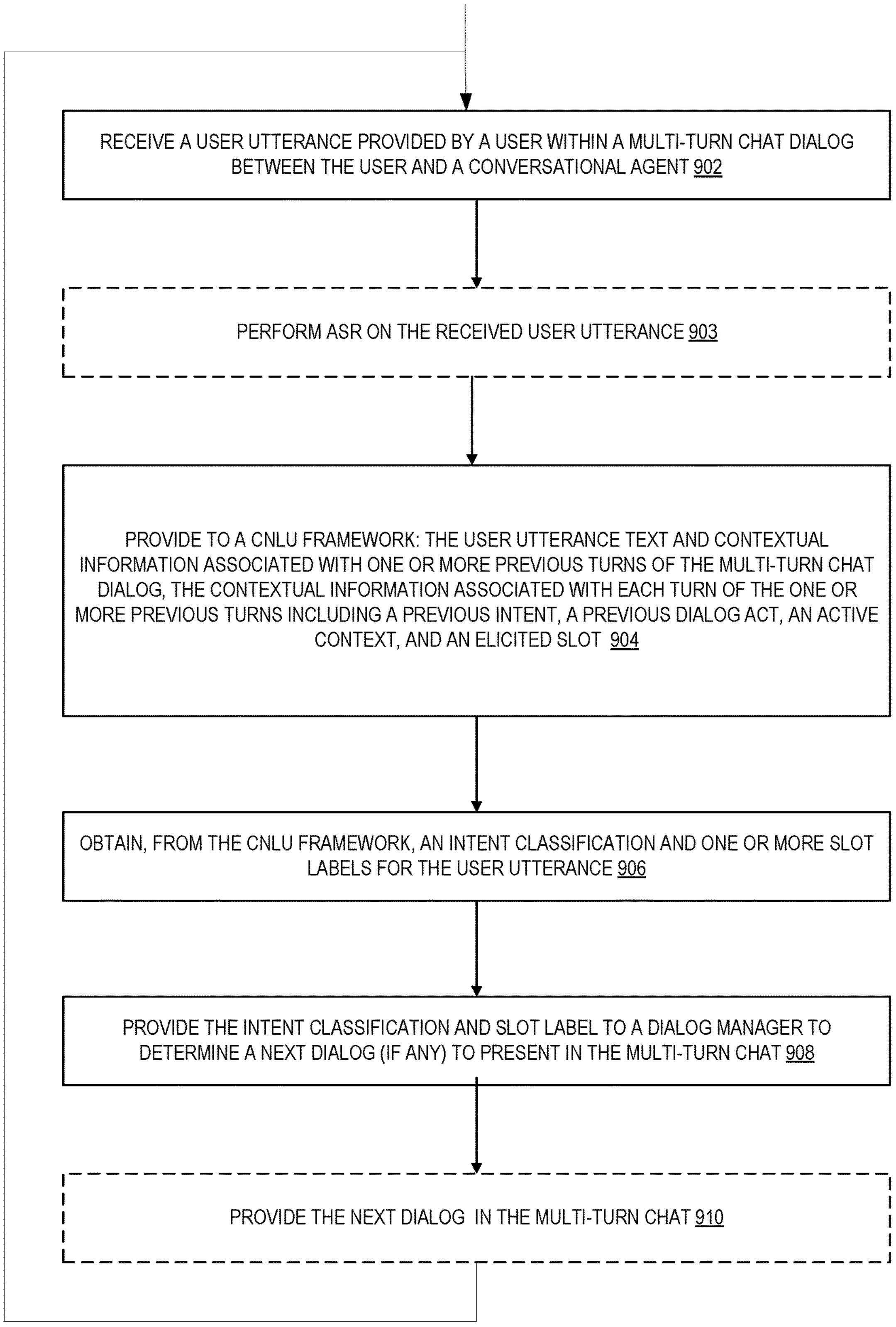
FIG. 9 is a flow diagram illustrating operations of a method for using a contextual natural language understanding (cNLU) framework that is to perform joint intent classification (IC) and slot labeling (SL) tasks according to some embodiments.

FIG. 9 is a flow diagram illustrating operations of a method for using a contextual natural language understanding (cNLU) framework that is to perform joint intent classification (IC) and slot labeling (SL) tasks according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by contextual natural language understanding (cNLU) framework of the other figures.

At 902 a user utterance provided by a user within a multi-turn chat dialog between the user and a conversational agent is received.

In some embodiments, at 903, automatic speech recognition (ASR) is performed on an audible user utterance to generate utterance text.

The user utterance text and contextual information associated with one or more previous turns of the multi-turn chat dialog, the contextual information associated with each turn of the one or more previous turns including a previous intent, a previous dialog act, active context, and an elicited slot are provided to the cNLU framework at 904. The cNLU framework includes a ICSLH that is independent of an encoder with the encoder receiving the input utterance text and the ICSLH receiving the rest. In some examples, the ICSLH is implemented on a CPU and the encoder on an accelerator. In some examples, the ICSLH and encoder are both implemented on a CPU. In some examples, the ICSLH and encoder are both implemented on an accelerator.

At 906, an intent classification and one or more slot labels for the user utterance are obtained from the cNLU framework.

The intent classification and slot label are provided to a dialog manager to determine a next dialog (if any) to present in the multi-turn chat at 908.

In some embodiments, the next dialog is provided in the multi-turn chat at 910. In some embodiments, another action is performed.

Figure 10:
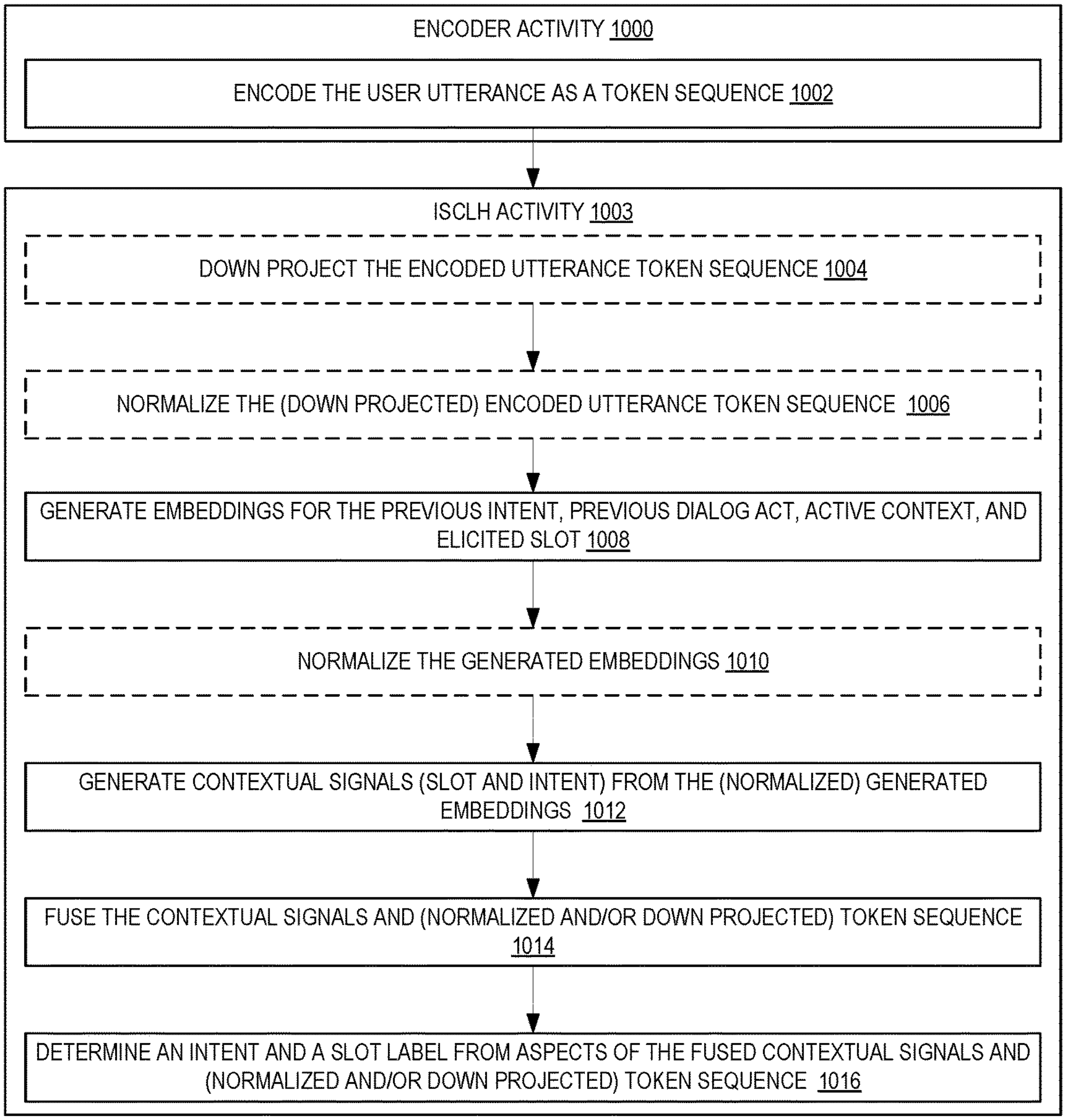
FIG. 10 is a flow diagram illustrating operations of a method of a natural language understanding (cNLU) framework performing joint intent classification (IC) and slot labeling (SL) tasks according to some embodiments.

FIG. 10 is a flow diagram illustrating operations of a method of a natural language understanding (cNLU) framework performing joint intent classification (IC) and slot labeling (SL) tasks according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by contextual natural language understanding (cNLU) framework of the other figures.

An encoder portion performs one or more acts at 1000. At 1002 the user utterance is encoded as a token sequence.

A ICSLH portion performs one or more acts at 1003.

In some embodiments, the token sequence is down projected at 1004.

In some embodiments, the (down projected) encoded utterance token sequence is normalized at 1006. Note that in some examples, 1004 and 1006 are considered to be a part of the encoder.

At 1008, embeddings for the previous intent, previous dialog act, active context, and elicited slot are generated. Additionally, in some embodiments, an encoding of the previous utterance is made.

In some embodiments, the generated embeddings (and encoded previous utterance if present) are normalized at 1010. Note that the normalization makes the token sequence and embeddings be the same size.

Contextual signals, both slot and intent, are generated from the (normalized) generated embeddings at 1012. As noted above, in some embodiments, one or more fully-connected layers are applied to a combination (e.g., a concatenation) of the (normalized) generated embeddings (and (normalized) encoded previous utterance) and then, in some embodiments, normalized.

The contextual signals and (normalized and/or down projected) token sequence are fused at 1014. As detailed, in some embodiments, this fusion is performed using a plurality of self-attention layers.

An intent and a slot label from aspects of the fused contextual signals and (normalized and/or down projected) token sequence at 1016. In particular, the fusion of contextual signal for the intent is combined with the class of the input utterance and evaluated by the intent classifier, and the fusion of the contextual signal for the slot label is combined with the token(s) of the user utterance and evaluated by the slot label classifier.

Figure 11:
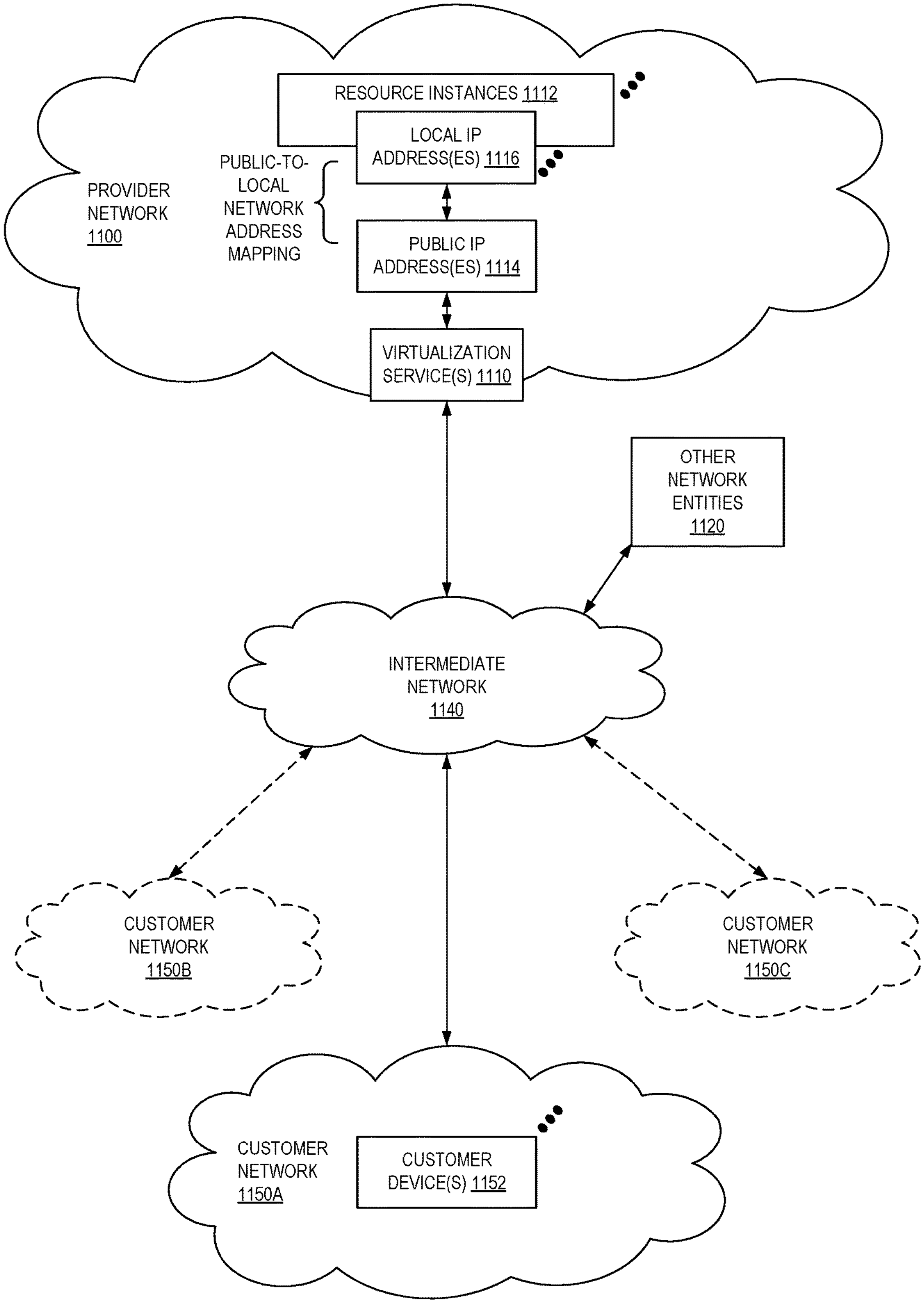
FIG. 11 illustrates an example provider network environment according to some examples.

FIG. 11 illustrates an example provider network (or "service provider system") environment according to some examples. A provider network 1100 can provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 can be associated with the resource instances 1112; the local IP addresses are the internal network addresses of the resource instances 1112 on the provider network 1100. In some examples, the provider network 1100 can also provide public IP addresses 1114 and/or public IP address ranges (e.g., Internet Protocol version 4 (IPv4) or Internet Protocol version 6 (IPv6) addresses) that customers can obtain from the provider 1100.

Conventionally, the provider network 1100, via the virtualization services 1110, can allow a customer of the service provider (e.g., a customer that operates one or more customer networks 1150A-1150C (or "client networks") including one or more customer device(s) 1152) to dynamically associate at least some public IP addresses 1114 assigned or allocated to the customer with particular resource instances 1112 assigned to the customer. The provider network 1100 can also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of the customer network(s) 1150A-1150C can, for example, implement customer-specific applications and present the customer's applications on an intermediate network 1140, such as the Internet. Other network entities 1120 on the intermediate network 1140 can then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 can be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1100; a customer can then assign their allocated public IP addresses to particular resource instances allocated to the customer. These public IP addresses can be referred to as customer public IP addresses, or simply customer IP addresses. Instead of being assigned by the provider network 1100 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
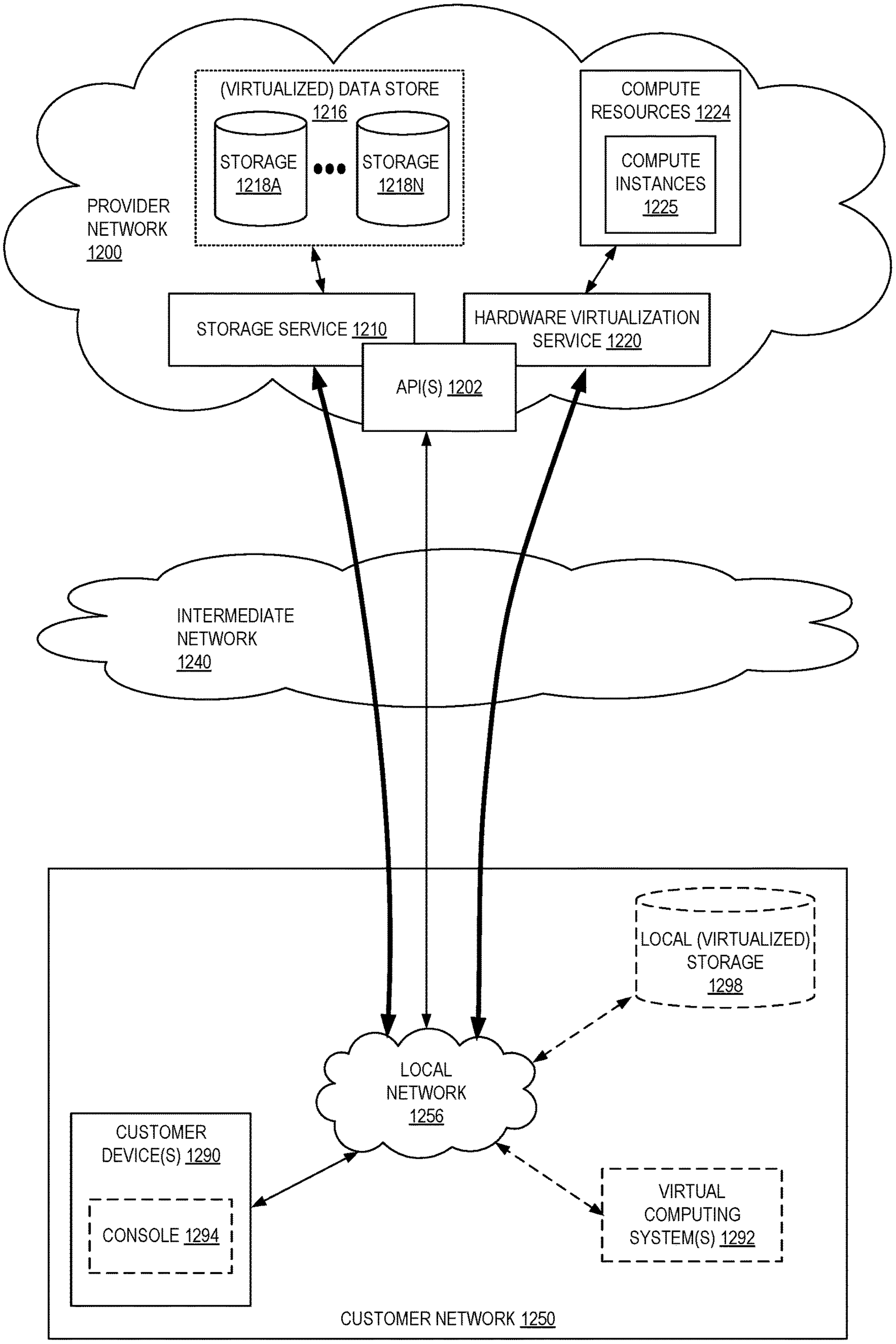
FIG. 12 is a block diagram of an example provider network that provides a storage service and a hardware virtualization service to customers according to some examples.

FIG. 12 is a block diagram of an example provider network environment that provides a storage service and a hardware virtualization service to customers, according to some examples. A hardware virtualization service 1220 provides multiple compute resources 1224 (e.g., compute instances 1225, such as VMs) to customers. The compute resources 1224 can, for example, be provided as a service to customers of a provider network 1200 (e.g., to a customer that implements a customer network 1250). Each computation resource 1224 can be provided with one or more local IP addresses. The provider network 1200 can be configured to route packets from the local IP addresses of the compute resources 1224 to public Internet destinations, and from public Internet sources to the local IP addresses of the compute resources 1224.

The provider network 1200 can provide the customer network 1250, for example coupled to an intermediate network 1240 via a local network 1256, the ability to implement virtual computing systems 1292 via the hardware virtualization service 1220 coupled to the intermediate network 1240 and to the provider network 1200. In some examples, the hardware virtualization service 1220 can provide one or more APIs 1202, for example a web services interface, via which the customer network 1250 can access functionality provided by the hardware virtualization service 1220, for example via a console 1294 (e.g., a web-based application, standalone application, mobile application, etc.) of a customer device 1290. In some examples, at the provider network 1200, each virtual computing system 1292 at the customer network 1250 can correspond to a computation resource 1224 that is leased, rented, or otherwise provided to the customer network 1250.

From an instance of the virtual computing system(s) 1292 and/or another customer device 1290 (e.g., via console 1294), the customer can access the functionality of a storage service 1210, for example via the one or more APIs 1202, to access data from and store data to storage resources 1218A-1218N of a virtual data store 1216 (e.g., a folder or "bucket," a virtualized volume, a database, etc.) provided by the provider network 1200. In some examples, a virtualized data store gateway (not shown) can be provided at the customer network 1250 that can locally cache at least some data, for example frequently accessed or critical data, and that can communicate with the storage service 1210 via one or more communications channels to upload new or modified data from a local cache so that the primary store of data (the virtualized data store 1216) is maintained. In some examples, a user, via the virtual computing system 1292 and/or another customer device 1290, can mount and access virtual data store 1216 volumes via the storage service 1210 acting as a storage virtualization service, and these volumes can appear to the user as local (virtualized) storage 1298.

While not shown in FIG. 12, the virtualization service(s) can also be accessed from resource instances within the provider network 1200 via the API(s) 1202. For example, a customer, appliance service provider, or other entity can access a virtualization service from within a respective virtual network on the provider network 1200 via the API(s) 1202 to request allocation of one or more resource instances within the virtual network or within another virtual network.

Illustrative Systems

Figure 13:
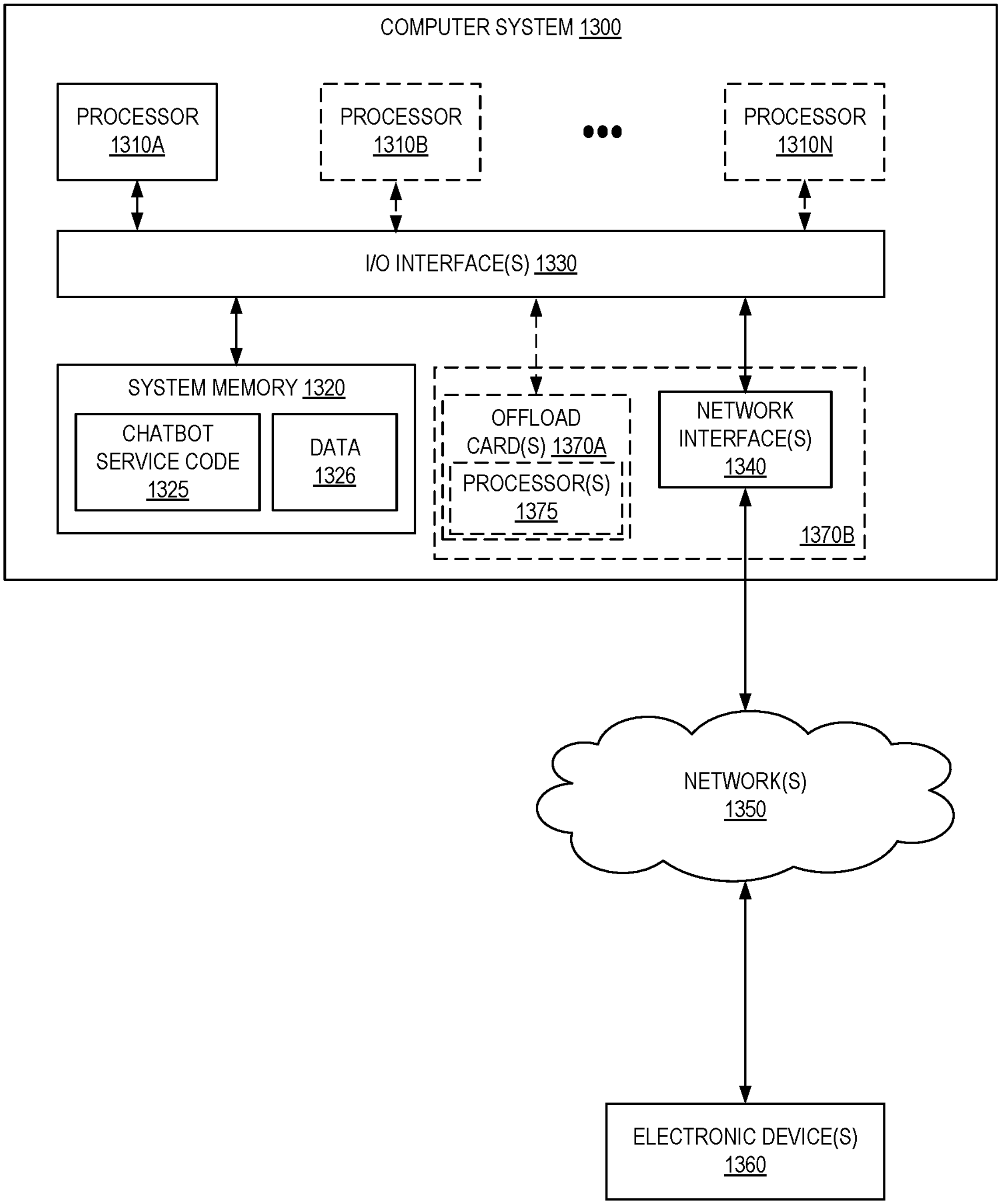
FIG. 13 is a block diagram illustrating an example computer system that can be used in some examples.

In some examples, a system that implements a portion or all of the techniques described herein can include a general-purpose computer system, such as the computer system 1300 illustrated in FIG. 13, that includes, or is configured to access, one or more computer-accessible media. In the illustrated example, the computer system 1300 includes one or more processors 1310 coupled to a system memory 1320 via an input/output (I/O) interface 1330. The computer system 1300 further includes a network interface 1340 coupled to the I/O interface 1330. While FIG. 13 shows the computer system 1300 as a single computing device, in various examples the computer system 1300 can include one computing device or any number of computing devices configured to work together as a single computer system 1300.

In various examples, the computer system 1300 can be a uniprocessor system including one processor 1310, or a multiprocessor system including several processors 1310 (e.g., two, four, eight, or another suitable number). The processor(s) 1310 can be any suitable processor(s) capable of executing instructions. For example, in various examples, the processor(s) 1310 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1310 can commonly, but not necessarily, implement the same ISA.

The system memory 1320 can store instructions and data accessible by the processor(s) 1310. In various examples, the system memory 1320 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1320 as chatbot service code 1325 (e.g., executable to implement, in whole or in part, the dialog service 100) and data 1326.

In some examples, the I/O interface 1330 can be configured to coordinate I/O traffic between the processor 1310, the system memory 1320, and any peripheral devices in the device, including the network interface 1340 and/or other peripheral interfaces (not shown). In some examples, the I/O interface 1330 can perform any necessary protocol, timing, or other data transformations to convert data signals from one component (e.g., the system memory 1320) into a format suitable for use by another component (e.g., the processor 1310). In some examples, the I/O interface 1330 can include support for devices attached through various types of peripheral buses, such as a variant of the Peripheral Component Interconnect (PCI) bus standard or the Universal Serial Bus (USB) standard, for example. In some examples, the function of the I/O interface 1330 can be split into two or more separate components, such as a north bridge and a south bridge, for example. Also, in some examples, some or all of the functionality of the I/O interface 1330, such as an interface to the system memory 1320, can be incorporated directly into the processor 1310.

The network interface 1340 can be configured to allow data to be exchanged between the computer system 1300 and other devices 1360 attached to a network or networks 1350, such as other computer systems or devices as illustrated in FIG. 1, for example. In various examples, the network interface 1340 can support communication via any suitable wired or wireless general data networks, such as types of Ethernet network, for example. Additionally, the network interface 1340 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1300 includes one or more offload cards 1370A or 1370B (including one or more processors 1375, and possibly including the one or more network interfaces 1340) that are connected using the I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1300 can act as a host electronic device (e.g., operating as part of a hardware virtualization service) that hosts compute resources such as compute instances, and the one or more offload cards 1370A or 1370B execute a virtualization manager that can manage compute instances that execute on the host electronic device. As an example, in some examples the offload card(s) 1370A or 1370B can perform compute instance management operations, such as pausing and/or un-pausing compute instances, launching and/or terminating compute instances, performing memory transfer/copying operations, etc. These management operations can, in some examples, be performed by the offload card(s) 1370A or 1370B in coordination with a hypervisor (e.g., upon a request from a hypervisor) that is executed by the other processors 1310A-1310N of the computer system 1300. However, in some examples the virtualization manager implemented by the offload card(s) 1370A or 1370B can accommodate requests from other entities (e.g., from compute instances themselves), and cannot coordinate with (or service) any separate hypervisor.

In some examples, the system memory 1320 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1300 via the I/O interface 1330. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1300 as the system memory 1320 or another type of memory. Further, a computer-accessible medium can include transmission media or signals such as electrical, electromagnetic, or digital signals, conveyed via a communication medium such as a network and/or a wireless link, such as can be implemented via the network interface 1340.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle (R), Microsoft (R), Sybase (R), IBM (R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

receiving a user utterance provided by a user within a multi-turn chat dialog between the user and a conversational agent;

providing to a contextual natural language understanding (cNLU) framework:

the user utterance, and contextual information associated with one or more previous turns of the multi-turn chat dialog, the contextual information associated with each turn of the one or more previous turns including a previous intent, a previous dialog act, an active context, and an elicited slot; and obtaining, from the contextual natural language understanding framework, an intent classification and one or more slot labels by:

encoding the user utterance using an encoder of an encoder subnetwork of the cNLU framework, wherein encoding the user utterance is independent of an intent classification and slot labelling head (ICLSH) subnetwork, in an ICSLH of the ICSLH subnetwork, generating embeddings for the contextual information, generating an intent contextual signal and a slot label contextual signal from the generated embeddings, fusing the encoded user utterance provided by the encoder subnetwork and contextual signals, and generating the intent classification and the one or more slot labels from the fused encoded user utterance based on context provided by the contextual signals;

providing the intent classification and the one or more slot labels to a dialog manager of the multi-turn chat dialog to determine a next dialog; and providing the next dialog in the multi-turn chat dialog to the user.

2. The computer-implemented method of claim 1, wherein a previous utterance is provided to the contextual natural language understanding framework along with the previous intent, the previous dialog act, and the elicited slot.

3. The computer-implemented method of claim 1, wherein the fusing is performed using a plurality of self-attention layers.

4. A computer-implemented method comprising:

receiving a user utterance provided by a user within a multi-turn chat dialog between the user and a conversational agent;

encoding, at an encoder subnetwork, the user utterance into a sequence of tokens using an encoder of the encoder subnetwork, wherein encoding the user utterance is independent of an intent classification and slot labelling head (ICLSH) subnetwork;

generating, at the ICLSH subnetwork, embeddings for contextual information, the contextual information associated with each turn of one or more previous turns including a previous intent, a previous dialog act, an active context, and an elicited slot; and generating, using an ICSLH of the ICLSH subnetwork, an intent classification and one or more slot labels from the encoded user utterance provided by the encoder subnetwork, based on context provided by the generated embeddings.

5. The computer-implemented method of claim 4, wherein the encoder subnetwork is implemented using an accelerator and the ICSLH subnetwork is implemented on a central processing unit.

6. The computer-implemented method of claim 4, wherein the sequence of tokens are down-projected and normalized.

7. The computer-implemented method of claim 4, wherein a contextual natural language understanding framework includes a plurality of embedding layers that generate the embeddings for the contextual information.

8. The computer-implemented method of claim 7, further comprising:

generating intent and slot label contextual signals from the generated embeddings.

9. The computer-implemented method of claim 4, wherein parameters of the encoder are not modified during training of the ICSLH.

10. The computer-implemented method of claim 8, further comprising:

fusing the sequence of tokens and the contextual signals using a multi-headed attention mechanism based on token types for the sequence of tokens and the contextual signals, wherein the intent classification and the one or more slot labels are generated from the fused sequence of tokens and contextual signals.

11. The computer-implemented method of claim 4, wherein a previous utterance is provided along with the previous intent, the previous dialog act, active context, and the elicited slot.

12. The computer-implemented method of claim 4, wherein the intent classification and the one or more slot labels are generated by two task-specific linear classifiers.

13. The computer-implemented method of claim 4, further comprising:

providing the intent classification and the one or more slot labels to a dialog manager of the multi-turn chat dialog to determine a next dialog; and providing the next dialog in the multi-turn chat dialog to the user.

14. The computer-implemented method of claim 4, wherein a contextual natural language understanding framework generates the intent classification and the one or more slot labels, the contextual natural language understanding framework being part of a dialog system running as a web-based service and wherein the method further comprises:

providing, by the web-based service, one or more responses to the user based at least in part on the intent classification and the one or more slot labels.

15. A system comprising:

a dialog system implemented by a first one or more electronic devices; and a contextual natural language understanding (cNLU) framework implemented by a second one or more electronic devices, the cNLU framework to:

receive a user utterance provided by a user within a multi-turn chat dialog between the user and a conversational agent;

receive contextual information associated with one or more previous turns of the multi-turn chat dialog, the contextual information associated with each turn of the one or more previous turns including a previous intent, a previous dialog act, an active context, and an elicited slot;

obtain an intent classification and one or more slot labels by:

encoding, at an encoder subnetwork of the cNLU framework, the user utterance using an encoder of the encoder subnetwork, wherein encoding the user utterance is independent of an intent classification and slot labelling head (ICLSH) subnetwork of the cNLU framework, and in an ICSLH of the ICSLH subnetwork, generating embeddings for the contextual information, generating an intent contextual signal and a slot label contextual signal from the generated embeddings, fusing the encoded user utterance provided by the encoder subnetwork and the contextual signals, and generating the intent classification and the one or more slot labels from the fused encoded user utterance based on context provided by the contextual signals; and provide the intent classification and the one or more slot labels to the dialog system.

16. The system of claim 15, wherein the encoder subnetwork is implemented using a graphical processing unit and the ICSLH subnetwork is implemented on a central processing unit.

17. The system of claim 15, wherein the encoder subnetwork and ICSLH subnetwork are implemented using a central processing unit.

18. The system of claim 15, wherein the user utterance is a text generated from audio input.

19. The system of claim 15, wherein the user utterance is a text.

20. The system of claim 15, wherein the dialog system is a chatbot.

* * * * *